United States Patent [19]

Gasiorowski

[11] Patent Number: 5,211,415
[45] Date of Patent: May 18, 1993

[54] BICYCLE FRAME WITH CHANNEL MEMBER

[76] Inventor: Roman J. Gasiorowski, 4434 Steffani La., Houston, Tex. 77041

[21] Appl. No.: 573,256

[22] Filed: Sep. 28, 1990

[51] Int. Cl.$^5$ ............................................. B62K 19/10
[52] U.S. Cl. ............................... 280/281.1; 228/173.4; 280/288.3
[58] Field of Search ................. 280/274, 281.1, 288.3; 228/173.4, 11

[56] References Cited

U.S. PATENT DOCUMENTS

| | | |
|---|---|---|
| 34,254 | 3/1801 | Sangster . |
| 112,875 | 1/1839 | Da Ros . |
| 148,531 | 2/1848 | Fletcher . |
| 191,754 | 11/1861 | Musichuk . |
| 210,059 | 1/1868 | Oakley . |
| D. 218,999 | 10/1970 | Ross et al. ............... D90/8 |
| D. 283,606 | 4/1886 | Moulton ................. D12/111 |
| 437,026 | 9/1890 | Flachs . |
| 442,275 | 12/1890 | Rothgiesser ............. 280/209 |
| 447,434 | 3/1891 | Latta ....................... 280/270 |
| 476,974 | 6/1892 | Bolte ....................... 280/281.1 |
| 616,383 | 12/1898 | Willatt . |
| 633,127 | 9/1899 | Duffy ...................... 280/274 |
| 683,381 | 9/1901 | Chamberlin ............ 280/281.1 |
| 694,567 | 3/1902 | Moore . |
| 2,107,506 | 2/1938 | Roe et al. ............... 280/274 |
| 2,244,709 | 6/1941 | Kinzel ..................... 280/281 |
| 3,233,916 | 2/1966 | Bowden ................. 280/274 |
| 3,269,480 | 8/1966 | Kirby ..................... 280/281.1 X |
| 3,448,997 | 6/1969 | Kosugi .................... 280/281 |
| 3,931,990 | 1/1976 | Knapp ..................... 280/281.1 X |
| 4,500,103 | 2/1985 | Klein ....................... 280/281 |
| 4,647,060 | 3/1987 | Tomkinson ............. 280/281 |
| 4,666,175 | 5/1987 | Mueller ................... 280/291 |
| 4,809,999 | 3/1989 | Tozawa et al. .......... 280/281.1 |

FOREIGN PATENT DOCUMENTS

| | | |
|---|---|---|
| 399275 | 7/1924 | Fed. Rep. of Germany ... 280/288.3 |
| 407969 | 1/1925 | Fed. Rep. of Germany ... 280/288.3 |
| 3804342 | 8/1989 | Fed. Rep. of Germany ... 280/288.3 |
| 3830961 | 3/1990 | Fed. Rep. of Germany ... 280/281.1 |
| 524444 | 9/1921 | France ........................... 280/288.3 |
| 869277 | 1/1942 | France . |
| 875868 | 10/1942 | France ........................... 280/274 |
| 877814 | 1/1943 | France ........................... 280/281.1 |
| 897769 | 3/1945 | France . |
| 1080852 | 12/1954 | France . |
| 2593768 | 8/1987 | France ........................... 280/288.3 |
| 400957 | 12/1942 | Italy . |
| 232048 | 4/1925 | United Kingdom ......... 280/288.3 |
| 371198 | 4/1932 | United Kingdom ......... 280/281.1 |
| 1361394 | 7/1974 | United Kingdom ......... 280/288.3 |
| 2117333 | 10/1983 | United Kingdom . |

Primary Examiner—Mitchell J. Hill
Attorney, Agent, or Firm—Robert Shaddox

[57] ABSTRACT

A bicycle frame using in combination with tubing elements a main channel frame member. The main load carrying member of the frame is an inverted "U" shaped section, or channel section which is tapered in both the horizontal plane and the vertical plane from the front of the bicycle frame to the rear of the bicycle frame (depth and width of the frame member increases from the front to the rear). A head tube is joined to the front of the channel frame, a seat mast tube runs through the middle portion of the channel frame member, and is anchored to the web of the channel frame, and a down tube extends from the top part of the head tube through the web of the channel section between the head tube and the seat mast tube to the lower portion of the seat mast tube where it is affixed to the seat mast tube, or to the bottom bracket. Optionally, further diagonal bracing elements can extend from the top of the seat mast tube to the back of the frame to connect to the channel frame member at either side of a rear wheel. In another alternative embodiment the optional diagonal bracing tubes are replaced with shock absorbing members, and the channel is provided with a hinge to provide a suspension for the rear wheel.

17 Claims, 4 Drawing Sheets

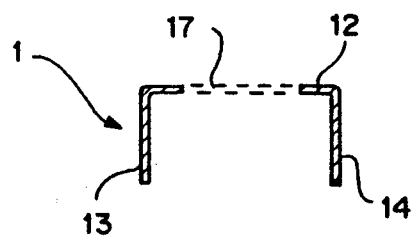
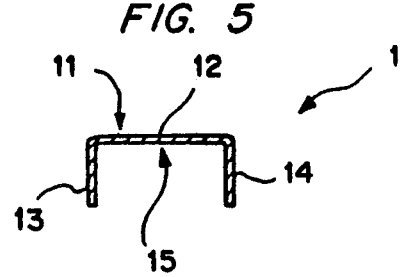
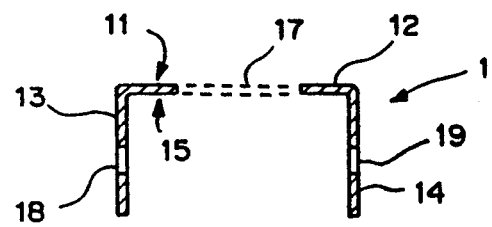
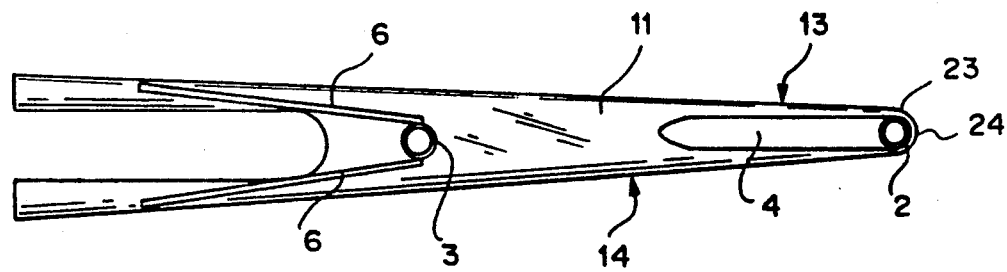
FIG. 7
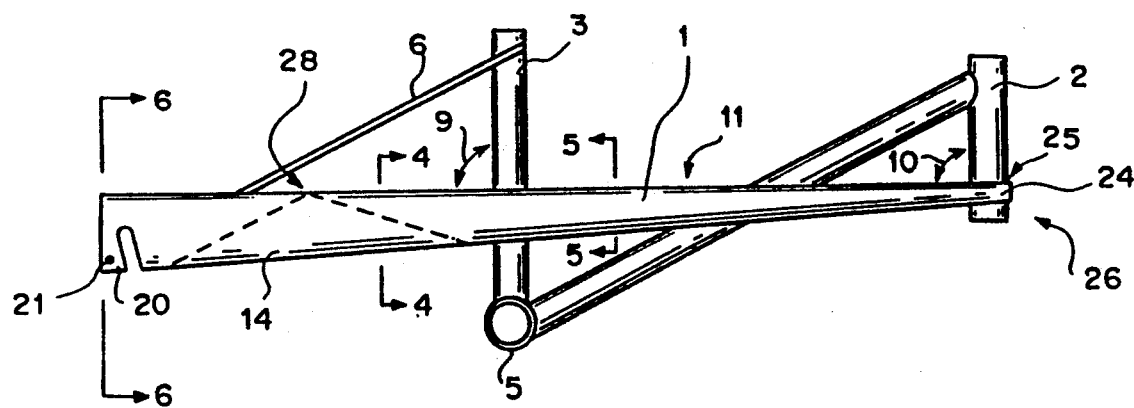
FIG. 8

BICYCLE FRAME WITH CHANNEL MEMBER

BACKGROUND AND PRIOR ART

This invention relates to bicycle frames. More particularly, this invention relates to a bicycle frame designed to provide improved handling and control characteristics.

In the past bicycle frames had been constructed of tubular members, either straight or curved, joined together to form a completed unit. Even racing bicycles, remain derivative of the classic diamond tubular frames.

Even special types of sports bicycles called BMX or free style bikes utilize variations on a diamond frame of triangulated tubular members.

Features desired in racing or sport bicycles are good handling, light weight, power train rigidity, and a low center of gravity. Features particularly desireable in BMX or sport-type free style bicycles is a standing platform or standing platforms, which are used for performing trick maneuvers. For these trick maneuvers it is desireable to have uncluttered standing room behind and below the seat and between the seat and the handle bars. Examples of such standing areas are shown in the GT Pro Series in red line BMX bikes illustrated on pages 6, 7, 8 and 9 of the March 1986 BMX Action Magazine.

Although there are conflicting theories and approaches to bicycle frame design, which remains as much an art as it is a science, one theory holds that frame stiffness directly corresponds to the efficiency of the power transmission from the rider's legs to the ground. Bicycles are subjected to reciprocating pedaling force, and standard bicycle designs with chain stays and seat stays, and in general, the diamond frame comprising tubular members welded or brazed together with or without lugs, is subject to a certain amount of distortion or deflection when subjected to the reciprocating periodic forces from the rider's legs pushing down on one side of the frame which is countered by the rider's grip upon the handle bars which pulls upward on the opposite side from the downward force. Although the deflection is somewhat spring like, there is an energy loss as not all of the energy is recaptured from the spring.

Stiffness is especially important in racing bicycle designs, and in off-road or trick bicycle designs. Racers, particularly when climbing or sprinting, lean the bicycle into the power leg up to 15°, increasing the need for lateral stiffness. Further, even minute energy losses add up, and in consideration of the length of some bicycle races, accumulative effects of such energy losses could be determinative of the outcome of the race.

Further evidence of the importance of fractional gains in efficiency can be seen in the radical frame and accessory designs seeking aerodynamic gains used in bicycles used for sprinting and professional races, such as the Tour de France. A change as simple as a different handle bar design was credited with providing the margin that allowed professional racer Greg LeMonde to win the 1989 Tour de France. See Sports Illustrated Vol. 71 No. 27, Dec. 25, 1989–Jan. 1, 1990. The Tour de France is an example of a long professional race where great sums of money are at stake, and fractional gains can add up to the difference between winning and losing over more than three (3) weeks of stage races, during which the riders cover an excess of 2,000 miles over widely varying terrain.

World class amateur and professional sprinters and bicycle racers are tremendously fit and can exert forces upon racing frames far greater than those of a recreational rider. The same is true for BMX and off-road bicycle riders whose bicycle frames are subjected to severe impact loads from jumps and bumps, both during recreational and racing.

The bicycle frame of the present invention can be configured to any wheel base, wheel diameter, head tube angle, seat tube angle, wheel width, rider weight, or specific use by varying the frame dimensions and/or materials as will be further described below. The frame design of the present invention utilizes a channel frame main member in combination with the seat tube, head tube and down tube used by diamond configured tubular frame designs. In comparison to the diamond configured tubular frame designs the present invention is lighter in weight which translates to lower energy demands, easier climbing, increased traction and road holding, and better handling in general. In addition, the channel member of the present frame design can easily be provided with means for mounting numerous accessories mandated by particular bicycle uses, or popular with racers and recreational riders. The flat sides of the channel frame provide easy mounting for derailleurs, and provide a protective enclosure for the power transmission components of a bicycle by covering the top of the chain sprocket at the crank, and by almost completely enclosing the rear hub or derailleur components. Optionally, standard derailleur components could be mounted to the outside face of one of the channel legs by a simple bolt on connection.

The channel frame components could also be injection molded or thermal molded from plastic materials for use in much smaller scale bicycles or tricycles for children and beginners. The protective covering over the drive chain, and the qualities of light weight, low center of gravity and good handling are equally important for beginners.

SUMMARY OF THE PRESENT INVENTION

The new and improved bicycle frame design presented herein eliminates a number of tubular parts, and replaces these with a single channel shaped load bearing member. The front part of the main channel frame member may be further reinforced by a tubular member exiting from the crank housing, or bottom bracket, and running to a connection at the upper portion of the head tube. This member intersects and is connected to the main channel frame member at a point intermediate the head tube and the seat mast.

Specific frame design features are that the main load carrying member ("u" shaped section or channel section) is tapered both in the horizontal plane and the vertical plane from the front of the bicycle frame to the rear of the bicycle frame. Depth and width increases from the front to the rear to absorb loads imposed by the rider. The front part of the channel is also wrapped around the lower portion of the head tube additionally reinforcing the lower part of the head tube and the connection of the main channel frame member to the head tube.

A seat mast tube is secured to a traditional bottom bracket housing and extends vertically upward through and is securely attached to the web of the channel section.

A down tube is also secured to the bottom bracket and intersects and is secured in place to the web of the channel section between the seat mast tube and the head tube. This down tube is then also secured to the upper portion of the head tube to further reinforce the head tube.

Diagonal reinforcement tubular members are optionally attached to the upper portion of the seat mast, and triangulated to the rear of the frame where they are secured to portions of the frame rear-ward from the seat mast for additional load carrying ability.

DESCRIPTION OF THE INVENTION

FIG. 4 is a cross-section through FIGS. 3 and 8.

FIG. 5 is a cross-section through FIGS. 3 and 8.

FIG. 6 is a cross-section through FIGS. 3 and 8.

FIG. 7 is a plan view of a second embodiment of the present invention.

FIG. 8 is a side view of the second embodiment of the present invention.

DESCRIPTION OF THE PREFERRED EMBODIMENT

This invention relates particularly to bicycle frames for improved handling and control due to the rigidity of the frame. This is especially desireable for certain types of racing and trick, or performance bicycles subjected to high power transfer or sudden impacts and bumps. The frame design resists sudden impacts and torque loads.

A high efficiency bicycle frame design and the importance of such a design for racing purposes is disclosed in U.S. Pat. No. 4,500,103 issued on Feb. 19, 1985 to Gary G. Klein. The Klein reference further discloses various suitable manufacturing techniques and materials, and the Klein reference is hereby fully incorporated by reference for all that it discloses.

U.S. Pat. No. 4,666,175 issued May 19, 1987 to Clifford F. Mueller discloses the desirability of certain frame designs providing standing platforms for trick manuevers. The Mueller reference also discloses the importance of providing suitable locations for necessary components, such as derailleurs, springs and sprockets and brakes for an uncluttered design which also protects the components. The Mueller patent is hereby incorporated by reference for all that it discloses.

The new and improved frame design of the present invention provides light weight, low center of gravity, good handling characteristics, and an efficient power train platform strong enough for rough use, such as in BMX or off-road riding and racing. The improved frame design of the present invention also provides for manufacturing economies, the channel member is an efficient design which can be inexpensively and quickly mass produced. Connections of the tubular members to the main channel frame member are both fewer and simpler to make than the traditional welding and/or brazing tube and lug designs that predominate the art of designing and manufacturing bicycle frames.

Figure 1:
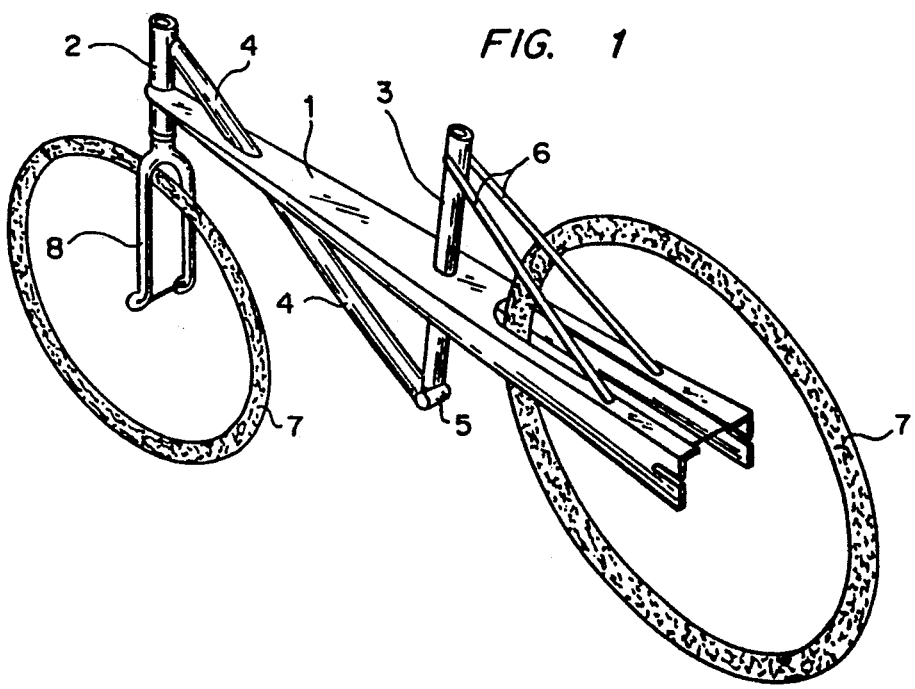
FIG. 1 is a perspective view of the bicycle frame to the present invention.
Figure 2:
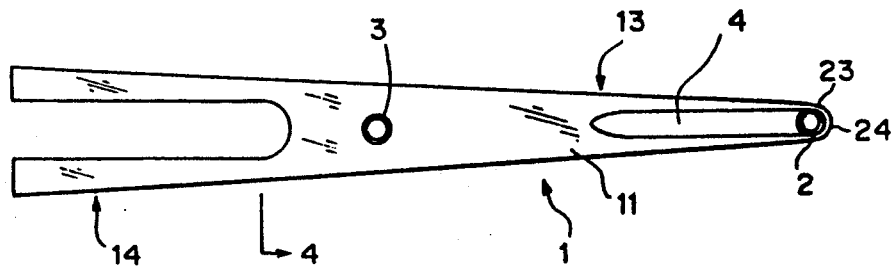
FIG. 2 is a plan view of a first embodiment of the present invention.

Referring to FIG. 1, there is illustrated in perspective view the frame design of the present invention. The component parts comprising the frame design will now be described with reference to FIG. 1, and referenced numerals for each of the component parts will be repeated in the following figures.

FIG. 1 is a perspective view of the present invention. Reference numeral 1 indicates the main channel frame structural member of the bicycle frame of the present invention. Numeral 2 indicates the head tube, numeral 3—the seat mast tube, numeral 4—the down tube, numeral 5—the bottom bracket, and numeral 6 indicates two longitudinal diagonal brace members which are used on an alternative embodiment of the present invention.

Also shown in FIG. 1 are the front and rear wheels 7, and the front fork 8. Not shown are the handle bars and handle bar stem assembly for steering and the power transmission means which, in the preferred embodiment, would comprise a set of cranks and sprockets mounted to the bottom bracket 5, provided with a chain, also not shown, running to either a rear derailleur assembly, or a coaster hub assembly with or without additional gears.

Figure 3:
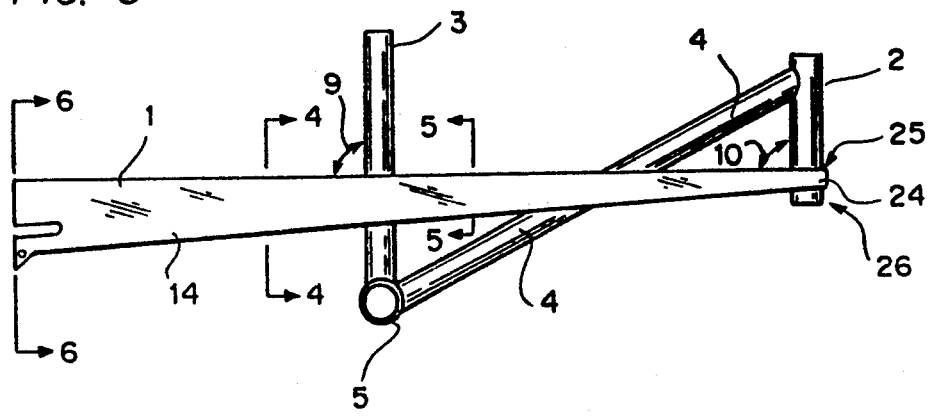
FIG. 3 is a side view of a first embodiment of the present invention.

In a primary embodiment a bicycle frame in accordance with the present invention has been constructed with the foregoing described and illustrated components wherein both the seat mast tube 3 and the head tube 2 are oriented at 90° angles, 9 and 10 respectively from the face 11 of the main member 1. FIGS. 3 and 8. It is known in the art of bicycle frame design that the handling characteristics of a bicycle can be varied by changing such variables as wheel base, the head tube angle/fork rake, and the amount of trail which, for the purposes of this disclosure, will be understood to mean the distance the front fork puts the axis of the front wheel ahead of the longitudinal axis of the head tube. A specific embodiment (illustrative only) in accordance with the present invention uses a head tube angle (defined as the angle between the horizontal and a line coinciding with the longitudinal axis of the head tube) of 71° and 30 minutes.

Referring now to FIGS. 4, 5, and 6, illustrated in various cross-sections is the channel member of one embodiment of the channel frame bicycle design of the present invention. The locations of these cross-sections are indicated in FIGS 3 and 8. The channel frame comprises a web 12 and two legs or walls 13 and 14, which in the primary embodiment are oriented 90° from the web 12, and project downward one each from each side of the web 12. The web 12 presents an upper exterior face 11, and a lower interior face 15. The web is narrower at the front and tapers outwardly to widen at the back, and both legs or walls are shorter at the front and taper lengthening toward the rear. Although the primary embodiment illustrates a channel section tapering in both the horizontal and vertical planes (if the web is oriented horizontally) from the front of the bicycle to the rear of the bicycle, alternative embodiments could utilize a channel section of uniform width and depth, or other channel type configurations than that illustrated here, such as an I-beam type cross section which also could either be varied in width and depth from the front of the bicycle to the rear, or could be of uniform width and depth. The primary embodiment would be that illustrated for reasons set out more fully below.

FIGS. 7, 8, 9, 10 and 11 illustrate various views of one embodiment of the present invention that is illustrated in perspective in FIG. 1. FIGS. 2, 3, 9, 10 and 11 illustrate like views of an alternative embodiment, one without the diagonal frame support members 6. The following description, except where specifically referring to the diagonal support element 6 should be interpreted to cover both illustrated embodiments.

Figure 12:
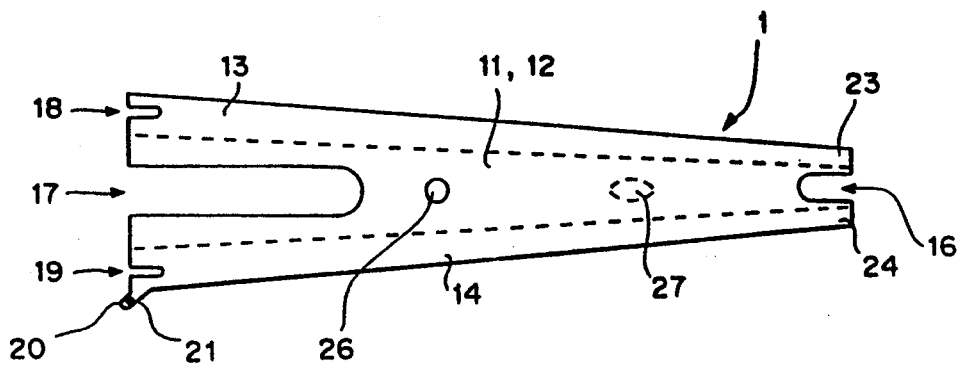
FIG. 12 is a development of the channel member laid out in a plane.

The basic design of the tapered channel frame element 1 has previously been described. It is envisioned that this channel frame member will be manufactured by cutting, stamping, or punching triangular shaped blanks (FIG. 12) from a flat sheet of T6061 aluminum, and either concurrently or as a subsequent step, press forming or stamp forming the flat sheets positioned over a press mold to ben the sheets into the channel section tapered taper from the front to the back in both vertical and horizontal dimensions. For example, a semi-triangular shape such as illustrated in FIG. 12 could be punched out of a sheet of ⅜ in. thick T6061 aluminum. The semi-triangular shape, illustrated in FIG. 12, is provided with four slots or cut-outs which can either be formed or fashioned or punched into the aluminum sheet as the semi-triangular shape is stamped out, or the slots can be cut out in the appropriate locations after the semi-triangular sheet is formed. Reference numerals 11, 12, 13 and 14 as referenced to FIG. 12 and the dashed lines from front to back of the semi-triangular shape indicate the top face 11 of the web 12, and the left 13 and right 14 legs of the channel respectively. The channel section comprising web and two legs as illustrated in FIGS. 4, 5 and 6 can be formed as a subsequent step or steps after the triangular or semi-triangular shape is fashioned, or they can be formed concurrently as part of an automated cutting shaping or press molding step.

The slots referred to previously are as follows: a head tube slot 16, a rear wheel slot 17, the left rear axle notch 18, and the right rear axle notch 19. FIG. 12. These slots are also indicated in FIGS. 4, 6, 2, 3, 7, 8, 9, 10 and 11 by like reference numerals.

Also illustrated in FIGS. 12 and 3 is a mounting bracket tab for mounting a rear derailleur. The tab 20 is drilled and tapped for a mounting bolt as are standard rear drop-outs known in the art. The mounting bracket 20 is drilled with a hole 21 which is tapped and threaded for a mounting bolt 22 as is common in the art. FIG. 8 illustrates an alternative arrangement for a mounting tab 20 and the left and right rear axle slots 18 and 19 respectively for mounting the rear wheel to the channel frame member. The dash line areas in FIGS. 4 and 6 indicate the locations of the rear wheel slot 17, and the left and right rear axle slots 18 and 19 respectively. Two tabs 23 and 24 projecting past the circumference of the head tube where it will be mounted, which is indicated by dash lines in FIG. 12, are used to further secure the head tube in place and brace the head tube, as the head tube is mounted into the front head tube cut-out 16, the two tabs 23 and 24 are wrapped around the front of the lower portion of the head tube section and welded top and bottom, and welded or otherwise connected down the jointing or mating seam of the two tab 23 and 24 to further secure and brace and support the head tube against impact and torque loads.

Although as mentioned, the relative geometry of the interconnected components of the bike frame can be modified to vary the handling and performance characteristics of a given bike, and to fit the intended used of a given bike, and to fit the physical characteristics of a given rider. A specific embodiment in accordance with the invention suitable for use as a BMX or free style sport type bike would utilize a channel frame member 33 and ⅞ in. in length, measured from the end most portion of the channel frame to the longitudinal axis through the head tube. As mentioned previously in the primary embodiment, both the head tube 2 and the seat mast 3 are oriented at 90° angles 10 and 9 respectively relative to the upper face 11 of the web 12 of the channel frame member. The distance between the head tube 2 and the seat mast tube 3 measured from the longitudinal axis of one to the longitudinal axis of the other is 18¼ in'. 1⅜ OD aluminum tubing is used for the head tube, and 1⅛ in. OD aluminum tubing is used for the seat mast tube 3 and the down tube 4. The overall longitudinal length of the head tube is 6¼ in's. As previously mentioned, the head tube is fitted into slot 16 at the front of the shaped channel member, the two tabs 23 and 24 are wrapped around the head tube as illustrated in FIGS. 2, 3, 7, 8, 9, 10 and 11 to tabs 23 and 24 are cut to exactly fit around the outer circumference of the head tube 2, and are there butt welded together down the vertical seam at the very front of the channel frame member. A fillet weld 25 is then made all 360° around the head tube at the intersection of the base of the head tube, and the top face 11 of the web 12 of the channel member 1. FIGS. 3 and 8. A second 360° weld 26 is placed at the head tube intersection with the forward projecting tabs 23 and 24, the side walls 13 and 14, and the lower face 15 of the web 12 of the channel member. FIGS. 3 and 8. In this specific illustrative embodiment the lower portion of the head tube is fixed to the front cut-out 16 provided at the front of the channel member so that a stub of head tube 26 projects below the channel member. In this specific illustrative embodiment the measurement from the top face 11 of the channel member to the very lowermost portion of the stub 26 measured parallel to the longitudinal axis of the head tube 2 measures 1⅜ in's.

In this specific illustrative embodiment the semi-triangular shape stamped or cut from the aluminum sheet measures 33⅞ in's. from the most rear-ward portion to the center line of the location of the head tube 2 as it fits into the cut-out notch 16. Prior to forming the channel sections illustrated in FIGS. 4, 5, and 6, the total width of the semi-triangular shape of the specific embodiment measures 10.312 in's. at the most rear-ward portion of the shape, or at the left of FIG. 12, the total width of this semi-triangular shape measured at a point 10 in's. towards the front from the left-ward portion of FIG. 12 is 8.187 in's., and the width across the triangular shape measured at a point 20 in's. toward the front from the left is 5.812 in's.

The shape is stamped or roll formed or molded, or otherwise fashioned into the channel sections illustrated in FIGS. 4, 5 and 6, preferably with interior corners on a ¼ in. radius. This gives interior width for the channel sections of 4 15/16 in's. at the rear or left most portion of FIGS. 2, 3, 7, 8, 9, 10 and 11, 4 1/16 in's. at the point 10 in's. from the rear, or left of the referenced FIGS., and 2 15/16 in's. at the point 20 in's. from the rear, or left most portion of the referenced FIGS.

The depth of the channel section therefore for the specific illustrative embodiments at these locations measured from the top face 11 of the web to the lower most portion of the channel legs 13 and 14 is 2 15/16 in's. at view 6, which is the rear-ward most portion of FIGS. 2, 3, 7, 8, 9, 10 and 11; 2 1/16 in's. at view 4 a section 10 in's. from the left most portion of FIGS. 2, 3, 7, 8, 9 and 10; and, 1 7/16 in's. at section 5, FIG. 5 which is a section 20 in's. from the left or rear-ward most portion of FIGS. 2, 3, 7, 8, 9 and 10.

This is a specific illustrative embodiment, and the invention is not to be understood to be limited to the dimensions set out, as indicated the variations can be made in dimensions, materials, and the geometry of the connected members to suit specific purposes or individuals.

Also shown in FIG. 12 are openings 26 and 27 which can be punched or formed in the semi-triangular shape at the same time the notches 18, 19, 16 and 17 are formed. Opening 26 is provided at the appropriate location for mounting the seat mast tube 3, and opening 27 is provided for passage of the down tube 4 through the upper surface of the web 11. Manufacturing advantages will be realized by forming all of these openings in an automated manner to precisely locate and orient the openings which will simplify the assembly of the components into a frame. For instance, the opening 26 can be formed at the desired angle (27° in the specific illustrated embodiment) so that when the down tube is placed through the surface of the web it can only be placed at the correct angle and alignment relative to the web of the channel frame member. This will eliminate or reduce the need for a jig to align such components during the assembly in connection of the various components of the frame. In addition, forming the opening 27 at the appropriate angle, corresponding with that desired for the down tube makes for better welding practice, therefore a joint that is structurally sounder.

Mounted to the lower portion of the seat mast tube 3 is a bottom bracket housing or mount 5. Although alternative configurations are used in the art, a bottom bracket essentially provides a mounting or housing for a power transmission means, or portions of the power transmission means (such as pedals, cranks and chain wheels). Pedals are connected to an axle passing through the housing transverse to the longitudinal axis of the bicycle frame, and the crank arms are mounted one each to each side of the axle. The axle is carried within the bottom bracket housing or mount on a set of bearings which may be sealed bearings or ball bearings, which are commonly mounted with a cone inside, cup outside bearing. One side of the bottom bracket housing, usually the right, is threaded for the mounting of a correspondingly threaded fixed cup. The other side of the bottom bracket housing is threaded for the mounting of an appropriately threaded adjustable cup and lock ring. The right cup is installed, ball bearings and cone surfaces on the axle then permit a means for rotation of the cranks. The bottom bracket housing of prior art bicycles requires precision alignment of at least four tubes, the down tube, the seat tube, and two chain stays. In contrast, the bottom bracket housing of the present invention only requires two tubes.

The seat mast tube and the down tube of the present invention are both selected from 1½ OD aluminum tubing. The seat mast tube and the down tube are both provided at their lower ends with a saddle shape cut into the tube so that the ends of the tubes will conform to the cylindrical surface at the outside of the bottom bracket housing 5. The seat mast tube is aligned perpendicularly to both the longitudinal axis of the cylindrical bottom bracket housing, and to the cylindrical surface of the bottom bracket, and is centered on the housing so that the longitudinal axis of the tubular seat mast intersects the mid point of the longitudinal axis of bottom bracket housing. The seat mast tube is welded 360° around the saddle of the intersection of the seat mast tube in the bottom housing to securing the bottom housing in the seat mast tube. The seat mast tube passes through opening 26 fashioned, formed or shaped in the channel web 12.

In the specific embodiment illustrated the length of the mast tube and the bottom bracket assembly is 14 inches measured from the upper end of the seat mast tube 3 to the center of the axis of the cylindrical bottom bracket housing. In the illustrated embodiment the seat mast tube is welded to the web 12 at the upper surface 11 360° around the seat mast tube in a fillet weld so that 9 inches of the seat mast tube projects perpendicularly upward from the upper surface 11 of the channel member, therefore the axis of the bottom bracket housing 5 is 5 inches below the upper surface of the channel member. This axis will also be 2 7/16 inches above the wheel base line measured from the axis of the front wheel to the axis of the rear wheel when the remainder of the frame is configured as will be further described below, and as previously discussed. Since both the head tube and seat mast tube are oriented perpendicularly to the upper surface of the channel member, the specific embodiment of the present invention herein described utilizes a head tube angle of 71° and 30 minutes measured to the horizontal (defined by a line running from the axis of the front wheel to the axis of the rear wheel which are of equal diameters in the instant case), therefore the angle of the seat mast tube to the horizontal just defined is also 71° and 30 minutes.

After the seat mast tube is welded into position the down tube is fitted through opening 27 in the upper surface of the web so that the channel section cut at the bottom of the down tube 4 nests against the cylindrical outer surface of the bottom bracket shell 5. The down tube saddle is shaped so that adjacent portions of the lower part of the seat mast tube, and the lower part of the down tube meet, or nearly meet, where they are both connected to the bottom bracket shell or housing. The longitudinal axis of the down tube, and the longitudinal axis of the seat mast tube intersect at a point below the longitudinal axis of the bottom bracket housing. In the specific embodiment illustrated the angle between the down tube axis and the bottom tube axis is 63°. The down tube is welded to the bottom bracket housing all 360° around the tube where the saddle cut into the lower portion of the down tube meets the outer cylindrical surface of the bottom bracket.

The down tube is then welded all 360° around the tube where the tube passes through the web of the channel frame member at the upper surface 11 of the channel frame member, and optionally at the lower surface 15 of the channel frame member.

A saddle cut is also made at the upper portion of the down tube 3 where it fits against the outer cylindrical surface of the upper portion of the head tube 2. When the frame is configured for the specific embodiment herein described there will be a ½ in. clearance measured from the top of the head tube 2 to the upper most point of the intersection of the down tube and head tube. The down tube is welded in place all 360° around the tube where the head tube saddle intersects and conforms to the upper portion of the head tube. The longitudinal axis of the down tube intersects with the longitudinal axis of the head tube, and the angle measured therebetween is 67°.

Referring now to FIGS. 1, 7 and 8 there is illustrated an alternative embodiment of the present invention which can further be provided with two diagonal bracing members 6. In the illustrated embodiment these longitudinal diagonal bracing members comprise ⅝ in OD aluminum tubes, each affixed by welding at an upper end to a point located near the upper end of the seat mast tube 3, and each diagonal brace 6 welded at its lower end to a point on the upper surface of the channel frame member between the rear of the channel frame member and the intersection of the channel frame member and the seat mast tube.

Figure 8A:
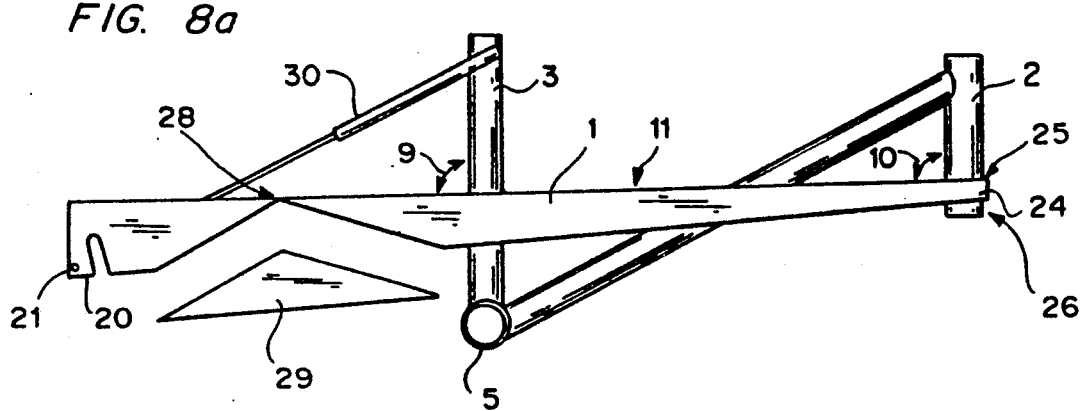
FIG. 8a is a side view of an alternative embodiment.
Figure 8B:
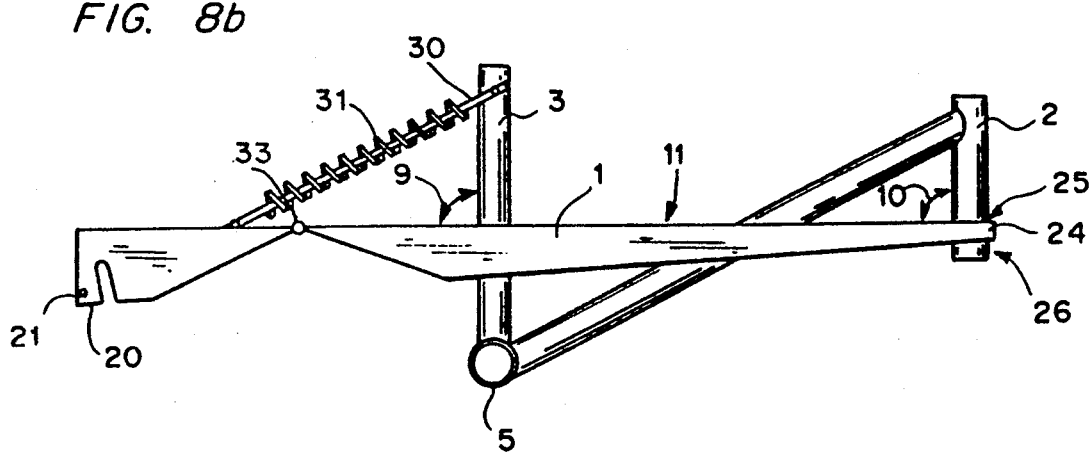
FIG. 8b is a side view of an alternative embodiment.
Figure 8C:
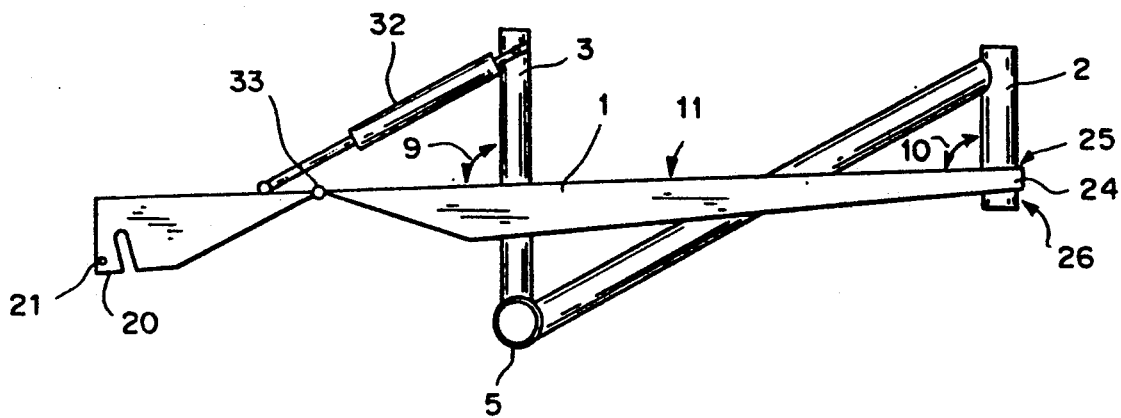
FIG. 8c is a side view of an alternative embodiment.
Figure 9:
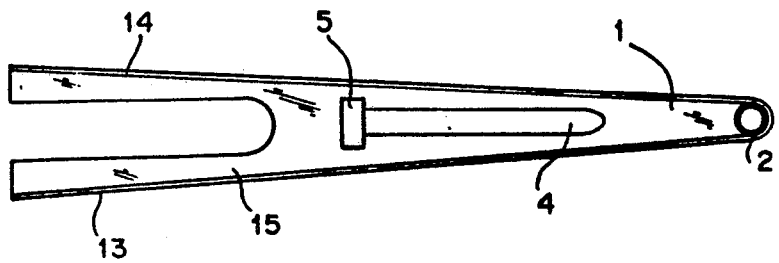
FIG. 9 is a bottom view of the present invention.
Figure 10:
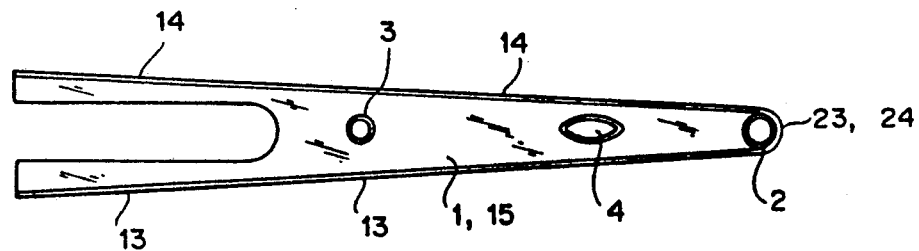
FIG. 10 is a cross-section through FIGS. 3 and 8.
Figure 11:
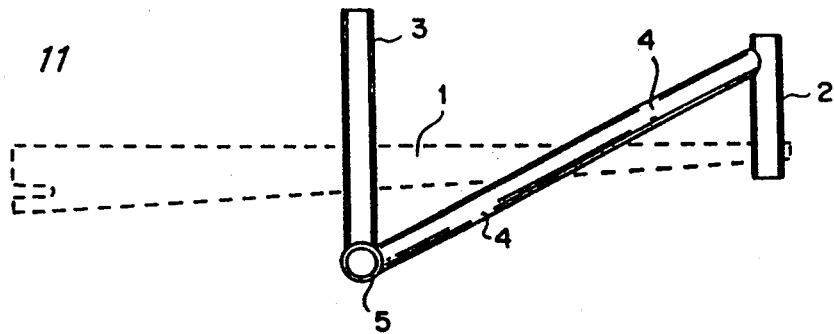
FIG. 11 is a cross-section through FIG. 3.

Although these optional diagonal support members 6 are illustrated in FIG. 8 as simple rigid tubes, they could be fashioned as telescoping tubes 30 provided with suspension means, such as a coil spring 31 either carried within the telescoping tubes 30 mounted to the exterior Of the telescoping tubes. See FIGS. 8a, 8b, and 8c. They can further be provided with hydraulic suspension means 32 either alone or in combination with the spring suspension means, for instance as used on motorcycles. For such an embodiment of the present invention provided with suspension means the channel frame disclosed herein could be further modified by sectioning the frame and providing a hinge 33 between sections, for instance as indicated in FIG. 8a by hinge location 28 and in FIGS. 8b and 8c as hinge 33 29 of FIG. 8 indicate portions of the channel frame which could be further cut away for an embodiment provided with such a hinged section frame and suspension means as in FIGS. 8b and 8c. Cutting away this section would further reduce the weight and compensate for some of the weight added in the suspension components.

The cut out or notch 17 provided for the rear wheel in the specific embodiments illustrated provides an opening 2½ inches across. This is ample clearance of the wider tires, such as are used on BMX and free style type machines. A racing frame would not need such a clearance, and the width of the whole frame could consequently be narrowed. Since the channel frame member also provides a protective guard over the upper portion of the chain sprocket mounted to the cranks, which are connected to an axle rotatably mounted in the bottom bracket housing, and also provides a guard for the upper part of the driving chain, a limiting factor on narrowing the interior clear width of the channel frame member measured from leg 13 to leg 14 would be the clearance needed for the types of gearing mounted to the bicycle.

The chain guard and partially enclosed drive train featured in the present invention is especially desirable in certain types of off-road cycle-cross or mountain type riding, and the partial enclosure or housing provides protection to the enclosed drive train components from under brush, tree stumps, sticks, limbs and the like. In a recreational commuter bicycle embodiment, the covering of the chain rings, the drive chain, and the rear sprockets's will keep clothing such as pants cuffs from being caught in any of these components.

The channel frame design of the present invention also provides ready mounting locations which facilitate the mounting of all types of bicycle equipment and accessories, such as derailleurs, two examples of which are indicated in FIGS. 6 and 12, and FIG. 8. Brake mount locations at the rear could be mounted either above or below the channel frame design, either at locations intermediate the seat mast post 3 and the wheel notch cut-out 17, or to the diagonal support tubes 6 if the frame is provided with such supports, or to either the upper surface or sides of the channel frame member outboard of the wheel notch cut-out 17 in an appropriate location to act against the wheel rim.

Although for the purposes of illustration specific embodiments of the present invention have been described, in particular referring to an aluminum alloy T6061 aluminum for both the tubes and the channel frame member, and having been described as welding said members together, the invention is not to be understood as limited thereto, or to the specific dimensions given for components.

The described components and materials—namely T6061 aluminum have the advantages of low cost, availability, established welding techniques, corrosion resistance, good machinability, and the materials are not brittle. This invention could also be constructed from other materials listing by way of illustration and not limitation: steel or steel alloys such as Reynolds 531, Berrilum alloys, Titanium alloys, Magnesium alloys, or composites of other materials including materials such as glass fibers, carbon fibers, high strength plastic fibers, boron fibers, aluminum oxide fibers, silicon fibers and the like, or molded plastics. Although all the tubes described were straight gauge, the tubes could be so made as to have larger wall thicknesses at the connecting joints, particularly desirable for certain of the mentioned alloys or materials. In addition, depending upon the material and intended use of the frame, the frame could be heat treated after welding to restore essentially full strength at the welded or brazed connections since some of the listed materials tend to lose strength in the welding or brazing process.

Although not fully shown in the illustrations, this invention further comprises the balance of the bicycle which is of conventional form, and which comprises a fork, head set, wheels, pedals, pedal cranks connecting the pedals to the crank axle, handle bars, brakes, and a drive chain drivingly connected between the crank axle and rear wheel, all of conventional form (also not shown).

Although certain connecting techniques, such as welding, have been described with reference to a particular embodiment, aluminum components, it should be understood that the means of connection will be chosen to suit the materials used to construct the frame in accordance with the present invention, and that certain materials would best be connected by brazing, gluing, bonding or otherwise interconnecting materials, and thus the connection means would be chosen to suit the material.

While a particular example of the present invention has been shown and described, it will be apparent to those of skill in the art that numerous changes and modifications can be made without departing from the invention. The purpose of the appended claims is to cover all such changes and modifications included within the spirit and scope of the invention. Therefore,

What is claimed is:

1. A bicycle frame comprising:
   (a) an elongate longitudinal channel member comprising walls and a web, with first and second ends wherein said channel member, when oriented horizontally, is tapered in both horizontal and vertical planes, being smaller at said first end and both wider and deeper at said second end, and wherein said web is partially cut out from said channel member at said second end;

(b) a head tube with upper and lower ends wherein a portion of said lower end is secured to said web of said channel member at said first end, and wherein said walls at said first end wrap entirely around said head tube;

(c) a seat mast tube with upper and lower ends, said seat mast tube secured at a point intermediate to said upper and lower ends to the web of said channel member at a point intermediate said first and second ends of said channel member;

(d) a down tube with first upper and second lower ends, wherein said first upper end is connected to the upper portion of said head tube and wherein said second lower end is connected to said seat mast tube near said lower end and wherein said down tube is connected to said web of said channel member at a point on said channel member intermediate to said first end of said channel member and said point where said seat mast tube is secured to said channel member.

2. The invention of claim 1 wherein said lower end of said seat mast tube is connected to said lower end of said down tube by bottom bracket means for mounting a power transmission assembly.

3. The invention of claim 1 wherein said web at said first end of said channel member and said lower portion of said head tube are secured by a welded connection.

4. The invention of claim 1 further comprising first and second longitudinal diagonal members each with a first and second end wherein said first ends of said diagonal members are connected to said upper end of said seat mast tube, and wherein said second ends of said diagonal members are each connected to said channel member at points between said point where said seat mast tube is secured to said channel member and said second end of said channel member.

5. The invention of claim 4 wherein said diagonal members are tubular members.

6. The invention of claim 4 wherein said channel member is provided with hinge means between said point where said seat mast tube is secured to said channel member and said second end of said channel member, and shock absorbing means, which in combination with said hinge means operates to minimize the effects of rough road conditions.

7. The invention of claim 6 wherein said shock absorbing means comprises springs mounted to act in combination with said diagonal members.

8. The invention of claim 6 wherein said shock absorbing means comprises at least one hydraulic cylinder mounted to act in combination with said diagonal members.

9. The invention of claim 6 wherein said diagonal members comprise hydraulic cylinders.

10. The invention of claim 1 wherein said channel member is aluminum.

11. The invention of claim 1 wherein said channel member and said head tube, said seat mast tube and said down tube are aluminum.

12. The invention of claim 1 further comprising a front fork and bicycle wheel assembly mounted within said head tube and further comprising two slots in said walls of said channel member closely proximate said second end of said channel member, one slot on each wall of said channel member for mounting a rear bicycle wheel assembly.

13. The invention of claim 1 wherein said channel member is cut from a sheet of metal and press formed to create said walls and said web and said taper from said first end to said second end which is relatively both wider and deeper in cross section than said first end.

14. A method for assembling a bicycle frame comprising the steps of:

(a) forming a longitudinal channel shaped member with first and second ends, walls and a web;

(b) connecting a head tube member, comprising upper and lower ends, at said lower end to said first end of said channel shaped member;

(c) connecting a longitudinal seat mast tube member at a point intermediate said first and second ends of said seat mast tube member to said channel shaped member through said web of said channel shaped member at a point intermediate said first and second ends of said channel shaped member;

(d) connecting a bottom bracket means to said lower end of said seat mast member;

(e) mounting a bicycle transmission assembly to said bottom bracket means;

(f) connecting a longitudinal down tube member, comprising upper and lower ends, at said lower end of said down tube member to said bottom bracket means, and at said upper end of said down tube member to said upper end of said head tube member; and, (g) connecting said down tube member to said web of said channel shaped member at a point on said down tube member intermediate said upper and lower ends, and at a point on said channel shaped member intermediate said connection with said head tube and said connection with said seat mast tube.

15. The invention of claim 14 wherein said steps of connecting said members comprise welding said members.

16. The invention of claim 14 wherein said steps of connecting said members comprise brazing said members.

17. The invention of claim 16 wherein said step of forming said channel shaped members comprises the step of stamping said channel shaped member from a metal sheet positioned over a press mold to bend said sheet into the channel form.

* * * * *